April 21, 1953  E. ARDELL  2,635,773
SHIPPING TRAY UNLOADING APPARATUS
Filed Sept. 8, 1949  9 Sheets-Sheet 1

INVENTOR.
EDGAR ARDELL
BY Pennie, Edmonds,
Morton and Barrows
HIS ATTORNEYS

INVENTOR.
EDGAR ARDELL
BY
Pennie, Edmonds, Morton & Barrows
HIS ATTORNEYS

April 21, 1953         E. ARDELL        2,635,773

SHIPPING TRAY UNLOADING APPARATUS

Filed Sept. 8, 1949         9 Sheets-Sheet 4

INVENTOR.
EDGAR ARDELL
BY
Rennie, Edmonds, Morton & Barrows
HIS ATTORNEYS

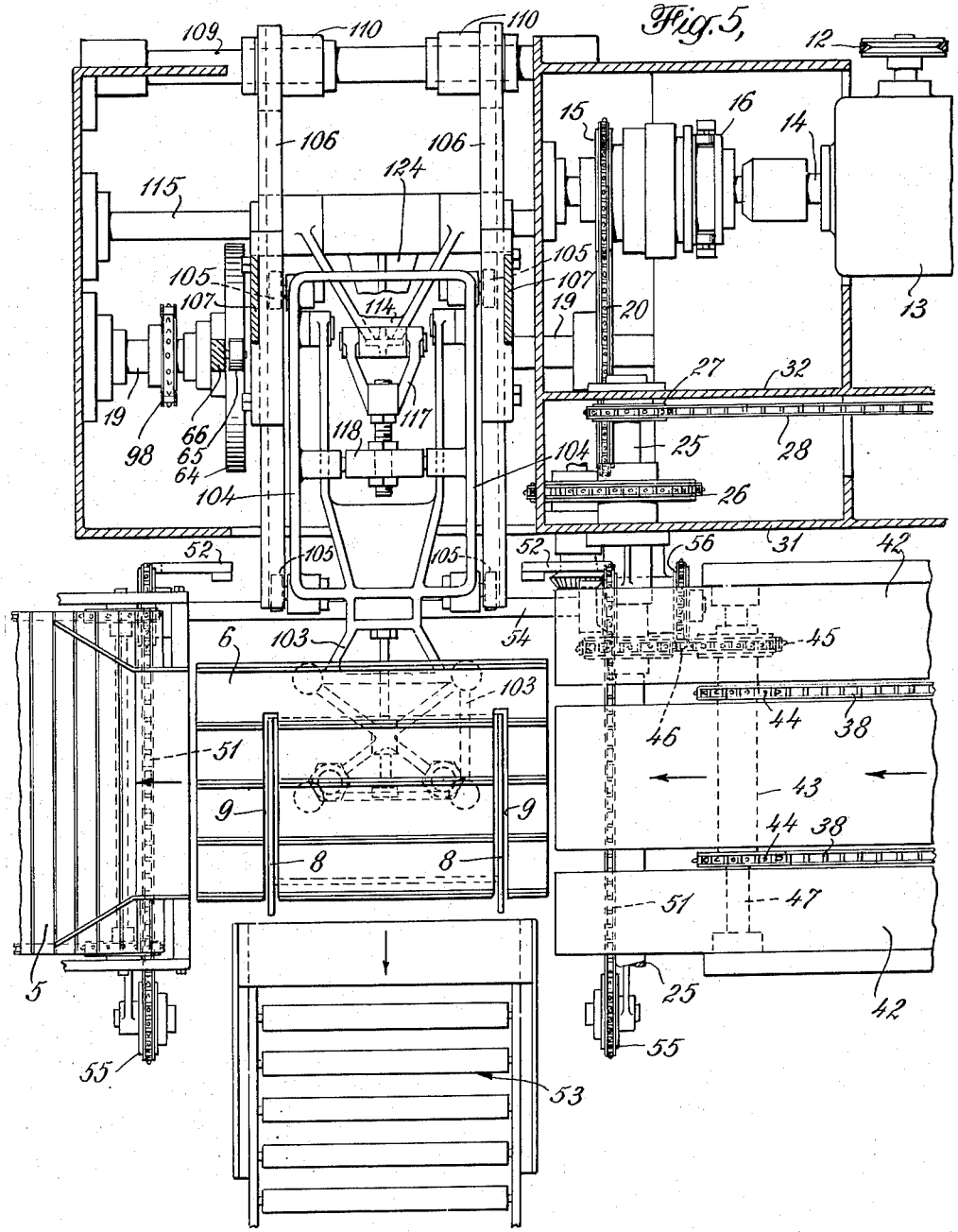

April 21, 1953 — E. ARDELL — 2,635,773
SHIPPING TRAY UNLOADING APPARATUS
Filed Sept. 8, 1949 — 9 Sheets-Sheet 6
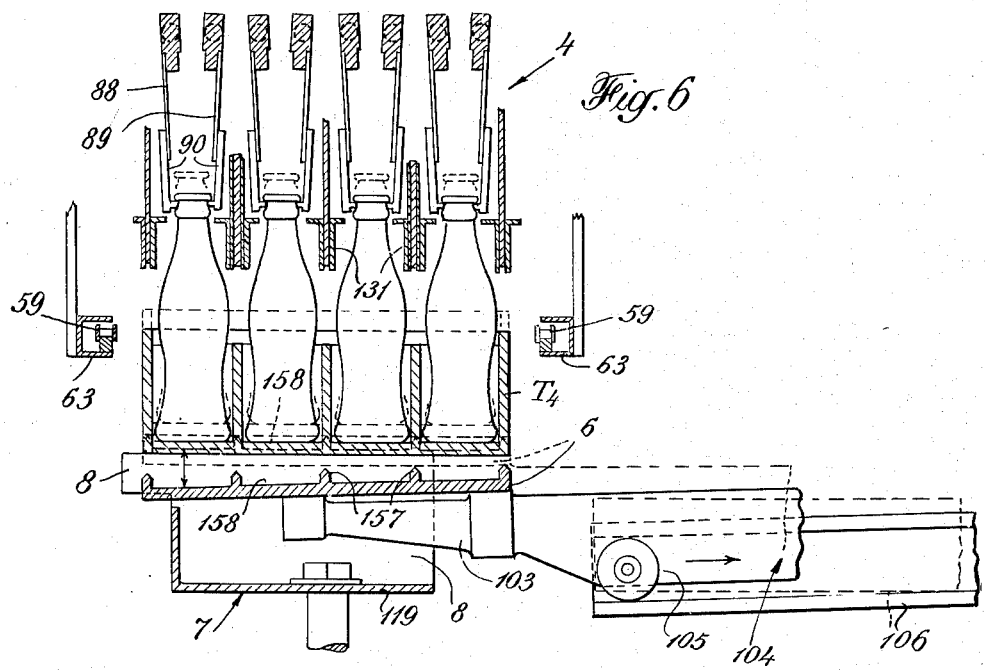
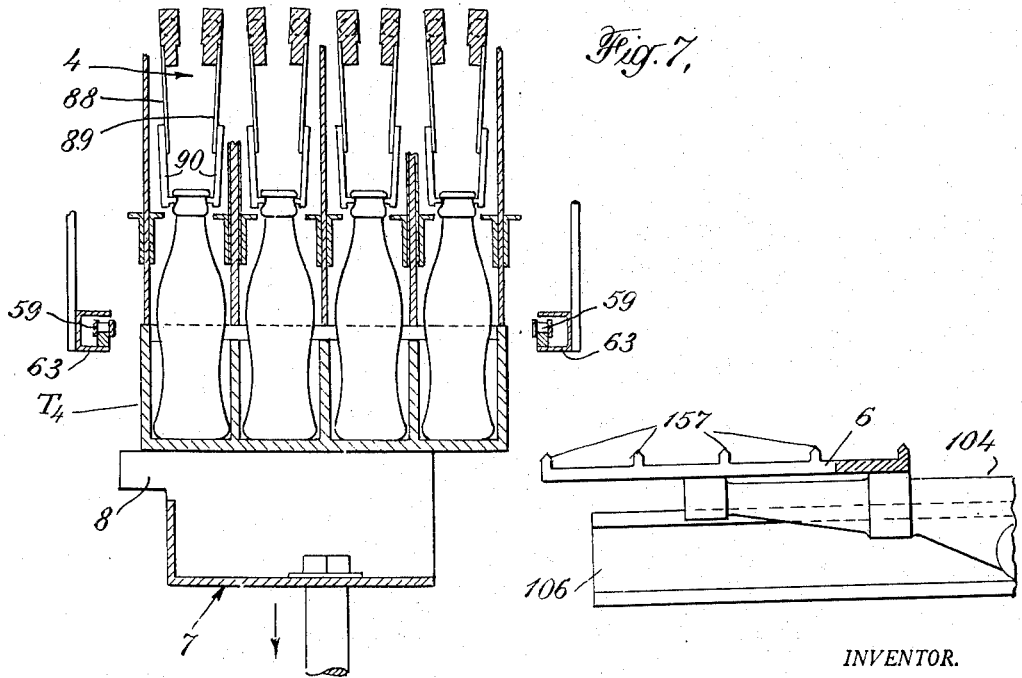
INVENTOR.
EDGAR ARDELL
BY
HIS ATTORNEYS

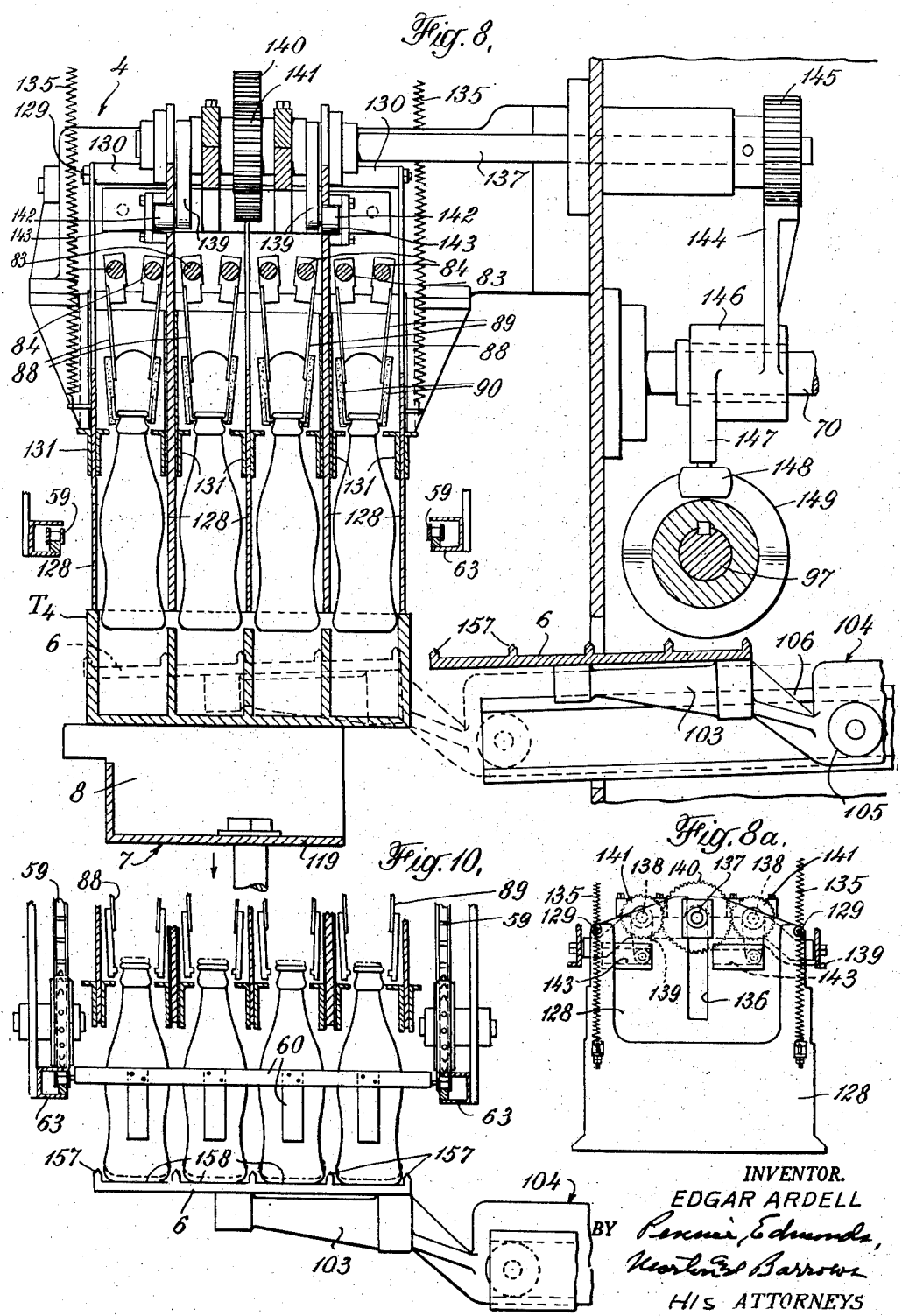

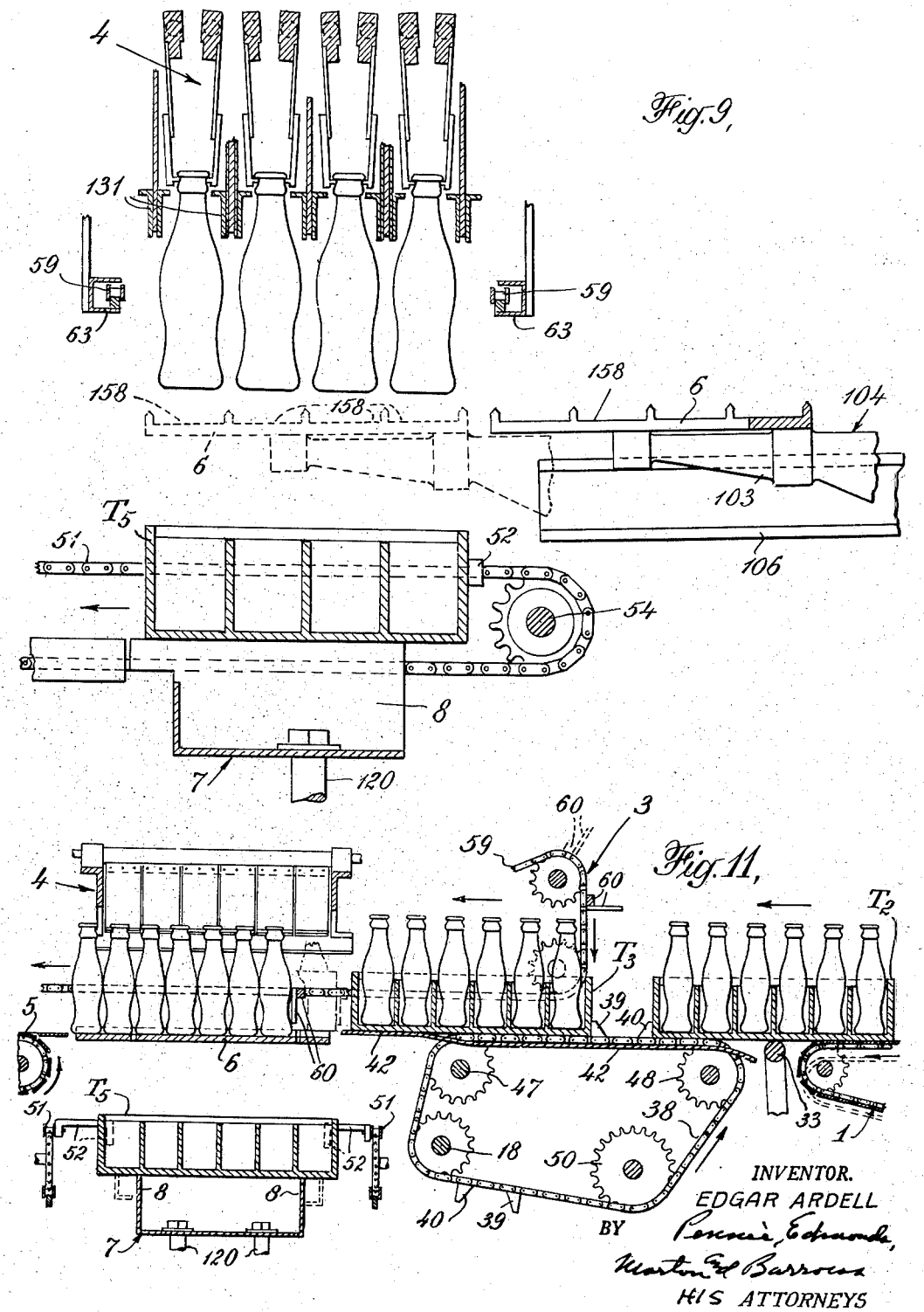

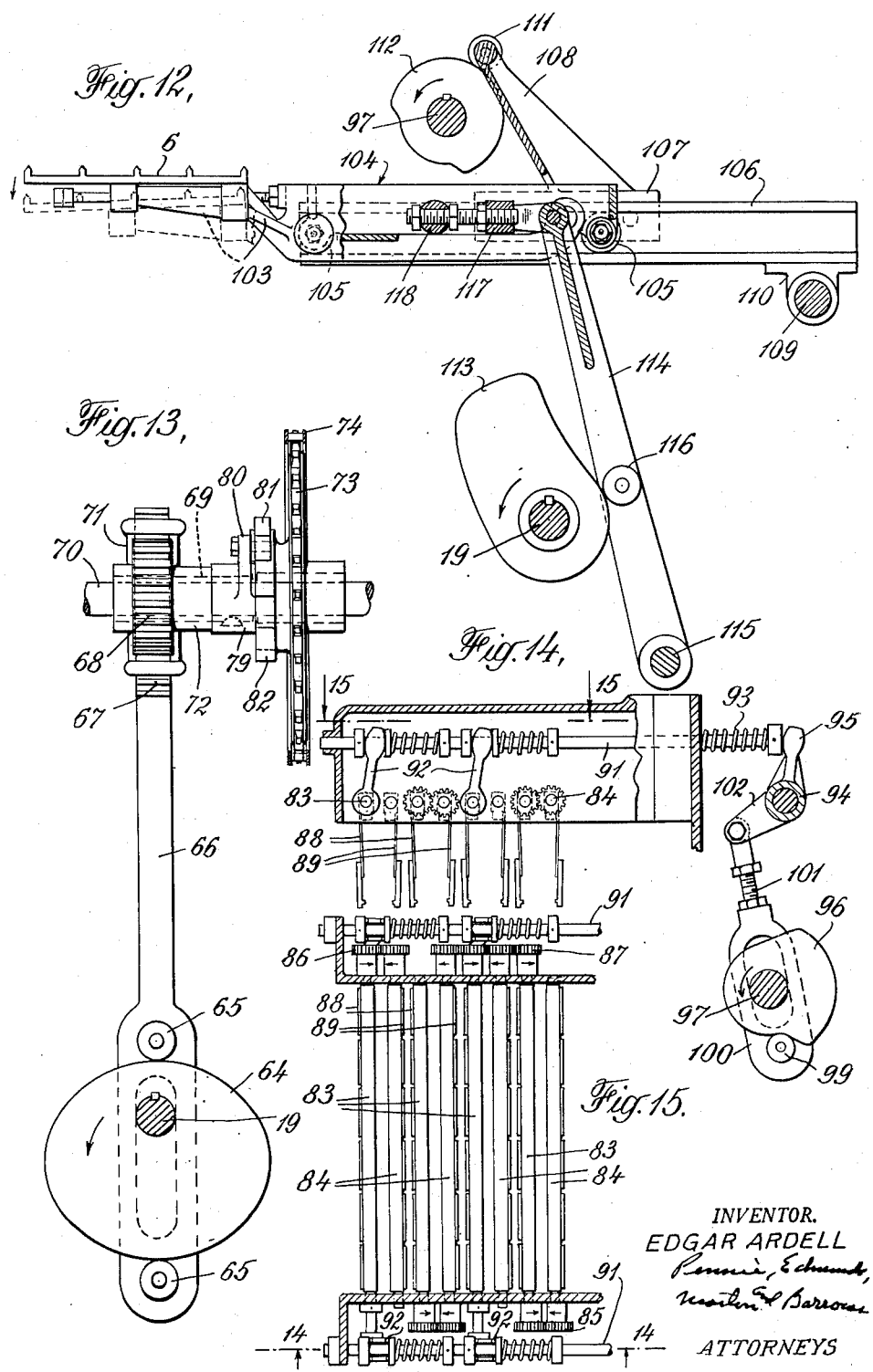

Patented Apr. 21, 1953

2,635,773

UNITED STATES PATENT OFFICE 2,635,773

SHIPPING TRAY UNLOADING APPARATUS

Edgar Ardell, Middletown, Conn., assignor to Emhart Manufacturing Company, a corporation of Delaware Application September 8, 1949, Serial No. 114,539

17 Claims. (Cl. 214—309)

This invention relates to apparatus for removing and unloading articles from shipping cases or trays. More particularly, it relates to apparatus for unloading bottles, or the like, from trays which are not as tall as the bottles so that the necks of the bottles project above the tops of the trays.

In the soft drink industry, it is customary to use returnable bottles which are distributed to the trade in trays, usually made of wood, but sometimes of fiber board or corrugated board, and having individual cells for the bottles. These trays conventionally hold 24 bottles each, and large quantities of such trays of empty bottles are received daily at the bottling plant. The first step in the processing of the bottles prior to refilling is their removal from the trays.

The primary object of the present invention is to provide an apparatus which will unload the bottles from such trays with the greatest possible rapidity and without damaging the bottles.

Another object of the invention is to provide a machine of this kind which will operate entirely automatically without requiring the attention of an operator.

Another object of the invention is to provide a bottle unloading apparatus of this kind in which the bottles remain at and leave the apparatus at substantially the same level at which they enter it.

The invention will be described as embodied in a machine for removing the bottles from Coca-Cola trays having 24 cells arranged in four rows of six each. For an understanding of the invention attention is directed to the following description taken in connection with the accompanying drawings illustrating this apparatus. In these drawings:

Fig. 3a is a sectional detail taken on line 3a—3a of Fig. 3;

Fig. 5 is a horizontal section taken on line 5—5 of Fig. 4;

Figs. 6 and 7 are enlarged diagrammatic views illustrating certain parts shown in Fig. 4 in different positions, these views when taken together with Figs. 1, 4, 8, 9 and 10 illustrating certain steps of operation of the apparatus.

Fig. 8 is a view of certain parts shown in Fig. 4 in different positions and drawn to an enlarged scale;

Fig. 8a is a detail elevation looking from the right of Fig. 8 and drawn to a smaller scale;

Fig. 9 is a diagrammatic view similar to Figs. 6 and 7 showing another position of the parts;

Fig. 10 is a fragmentary vertical section taken on line 10—10 of Fig. 1 showing the charge of bottles released by the gripper head and ready to be removed;

Fig. 11 is a diagrammatic view drawn to a smaller scale showing certain parts of Fig. 1 in different positions;

Fig. 12 is a detail section taken on line 12—12 of Fig. 2;

Fig. 13 is another detail section taken on line 13—13 of Fig. 2;

Fig. 14 is a further detail section taken on line 14—14 of Figs. 2 and 15; and

Fig. 15 is a section taken on line 15—15 of Fig. 14.

The general plan of the apparatus illustrated in the accompanying drawings will be set forth, following with a description of the details.

Figure 1:
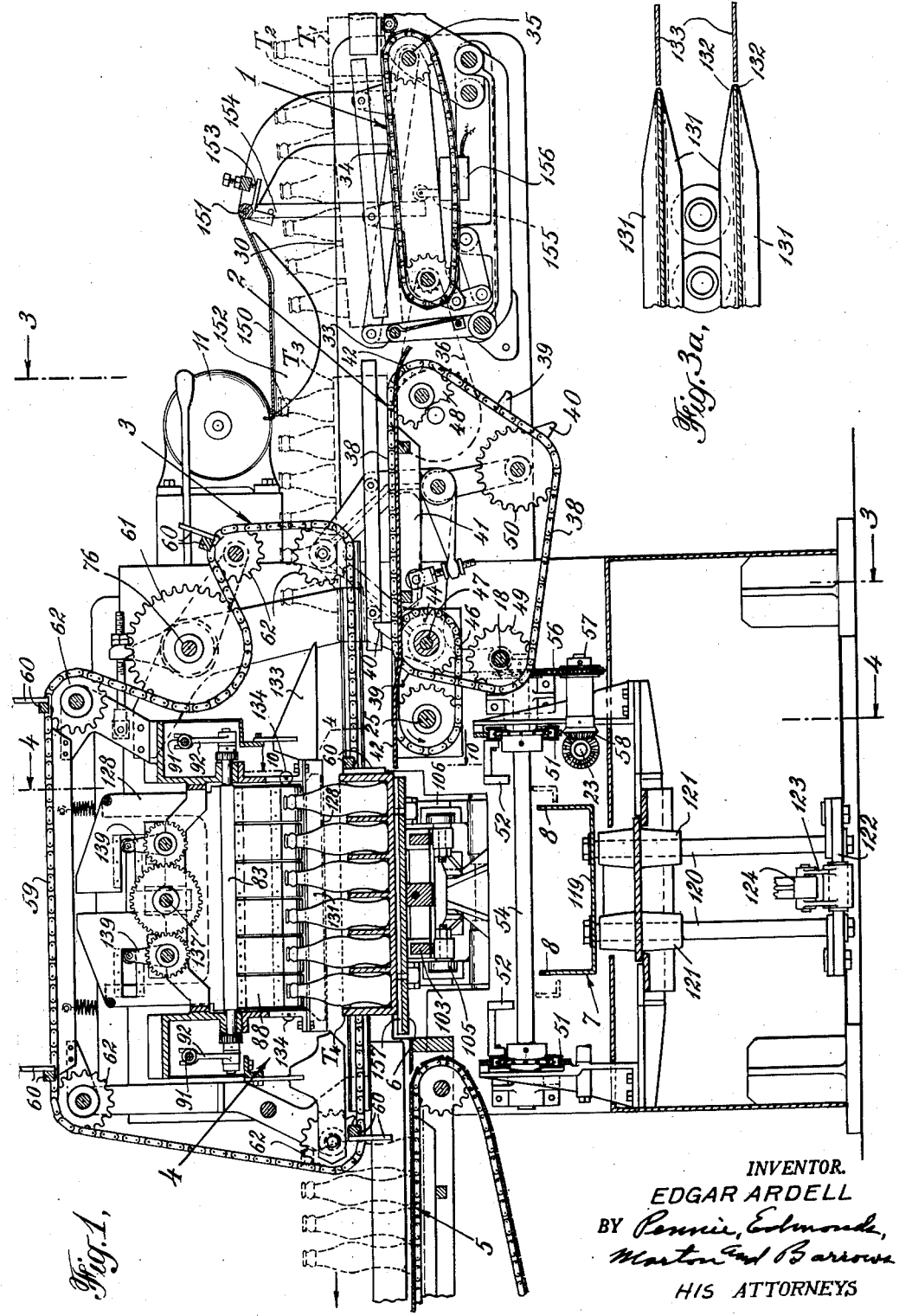
Fig. 1 is a vertical longitudinal central section of the unloading apparatus taken on a plane indicated by line 1—1 of Figs. 3 and 4.

Referring to Fig. 1, the trays filled with 24 bottles each enter the machine on a supply conveyer (not shown), the tray at position T1 being on this conveyer. The supply conveyer may be of the gravity, or any suitable type, which urges tray T1 against a tray at the second position T2 on a tray feeding or timing device indicated generally by reference numeral 1. Feeding device 1 holds back the line of trays and feeds them forward one at a time at the proper time to be received on a tray timing conveyer indicated generally by reference numeral 2, the tray at position T3 being on this conveyer.

Timing conveyer 2 operates to time the trays to a flight conveyer which is indicated generally by reference numeral 3. Flight conveyer 3 has the double function of feeding the filled trays forward to position them at position T3 beneath (bottle necks within) a stationary bottle gripper head, indicated generally by numeral 4, and of advancing the bottles, after the case has been removed from them, onto a bottle receiving table 5 which has been shown as an off-bearing conveyer.

Tray feeding device 1, case timing conveyer 2 and bottle receiving table or conveyer 5 are arranged at the same level. Also arranged at substantially this same level between case feeding conveyer 2 and bottle receiving table 5, that is, directly beneath the gripper head 4, there is a horizontally and laterally shiftable platen 6. Platen 6 serves both to support the filled tray while the bottles are gripped by their necks and suspended from gripper head 4, and also to support the bottles after the tray has been removed from them.

In order to permit removal of the tray from the suspended bottles platen 6 is first lowered slightly and then retracted laterally as shown, for example, in Figs. 6 and 7, and to support the tray during removal of the platen a tray remover which is indicated generally by reference numeral 7, and which comprises two parallel edgewise mounted plates 8, is moved upwardly beneath platen 6, these plates passing through two narrow slots 9 in the platen so that their upper edges are at the level of the top of the platen to support the case when the platen is retracted. Fig. 6 shows the parts in this position and with the bottles gripped by gripper head 4.

The charge of bottles remains suspended from gripper head 4 while platen 6 is lowered and shifted to the right as shown in Figs. 7 and 9, and while the tray remover 7 is lowered as shown in Fig. 8, and until the platen is returned beneath the bottles, whereupon gripper head 4 releases them and they drop onto the platen as shown in Fig. 10. Upon lowering the tray to position T5 (shown dotted in Fig. 4), the tray is ejected from the machine by means of a discharge conveyer 10. The charge of bottles on platen 6 (Fig. 10) is moved onto the receiving table or conveyer 5 by a step movement of flight conveyer 3, (see also Fig. 1), which simultaneously advances the next succeeding filled tray from position T3 to position T4 beneath gripper head 4.

The description of the various sections of the apparatus in detail will now be taken up.

Power for operating the machine is supplied by means of an electric motor 11 (Figs. 2 and 3) which is connected by means of an endless belt 12 to a speed-reducing gear box 13 having a slow speed output shaft 14. On shaft 14 is a sprocket 15 which, however, is driven from shaft 14 through a disconnecting clutch 16, which is operated by a handle 17 located at the front side of the machine and mounted on the end of a rock shaft 18.

Sprocket 15 drives the main or lower cam shaft 19 of the machine through a chain 20 and a suitable sprocket keyed to shaft 19. Power for operating tray timing conveyer 2, tray discharge conveyer 10 and tray feeding device 1 is derived from shaft 19. For this purpose a short transverse shaft 21 (Fig. 3) is operatively connected with shaft 19 through bevel gearing 22. Parallel to shaft 21 is a longer shaft 23 which is driven from shaft 21 by means of a chain 24 and suitable sprockets.

Above and between shafts 21 and 23, there is a third parallel shaft 25 (Fig. 2) which is driven from shaft 23 by means of a chain 26 and suitable sprockets. Near the right end of this shaft (Fig. 3) there is a sprocket 27 carrying a chain 28 which extends toward the right or intake end of the machine (Fig. 2) and drives a shaft 29 which is the operating shaft of the tray feeding or timing device 1. Shaft 29 is a short shaft journaled in the opposite sides of a housing 30 which is part of the apparatus frame and located on the further side of tray feeding device 1 as viewed in Figs. 1 and 2. The walls of housing 30 may be regarded as extensions (approximately) of the front wall 31 and an inwardly spaced vertical web 32 of the machine frame (Fig. 3).

The trays are fed along the supply conveyer (not shown) to the feeding or timing device 1, and the front end of each case, arriving at a stop roller 33, is momentarily arrested at the proper instant to time it with one of the pairs of lugs on tray timing conveyer 2, to be described presently. The tray is lifted over stop roller 33 by the tilting of a section 34 of belt conveyer. This belt conveyer section is pivoted at 35 to the machine frame, and when the left hand end is raised, serves to propel the tray over the stop roller.

The belt of conveyer 34 is operated by means of a chain 36 which is trained around a large sprocket on operating shaft 29. The timing mechanism of tray feeding device 1 is operated by means of a chain 37 also driven from shaft 29. The details of the construction and operation of this tray feeding or timing device are set forth in U. S. Patent No. 2,324,401, granted July 13, 1943, to Wallace D. Kimball and assigned to the same assignee as the present application.

The tray timing conveyer and spacer 2 comprises a pair of spaced endless chains 38 which carry two sets of tray pushing and spacing lugs 39 and 40 as shown in Fig. 1. Chains 38 support the weight of the tray as it is moved from feeding device 1 and carried toward the platen 6, the horizontal portions of these chains running on two parallel rails 41 supported on cross bars attached to the machine frame. Rails 41 are mounted in longitudinal slots in a flat plate 42, the forward end of which is curved downwardly as shown in Fig. 1.

The rear end of plate 42 curves upwardly to the level of the surface of chains 38 and serves as a scuff plate to carry the cases between the left end of these chains and platen 6. The function of plate 42, other than the scuff plate portion of it, is to prevent sections of the tray bottoms which may have become loosened, from becoming jammed in the operating parts of the machine.

Chains 38 are supported at their left ends on a spool sprocket member 43 (Fig. 3) which carries two suitably spaced sprockets 44 for chains 38 and a driving sprocket 45. A short chain 46 connects sprockets 45 with a smaller sprocket on shaft 25, previously mentioned. Spool sprocket 43 rotates on a fixed transverse shaft 47. At the right end of plate 42 chains 38 pass around idler sprockets 48 (Fig. 1). Also, the necessary idler sprockets 49 and 50 for the lower reaches of chains 38 are provided, sprockets 49 being mounted for rotation on clutch control shaft 18, and sprockets 50 being suitably mounted to serve as take-up sprockets.

Figure 3:
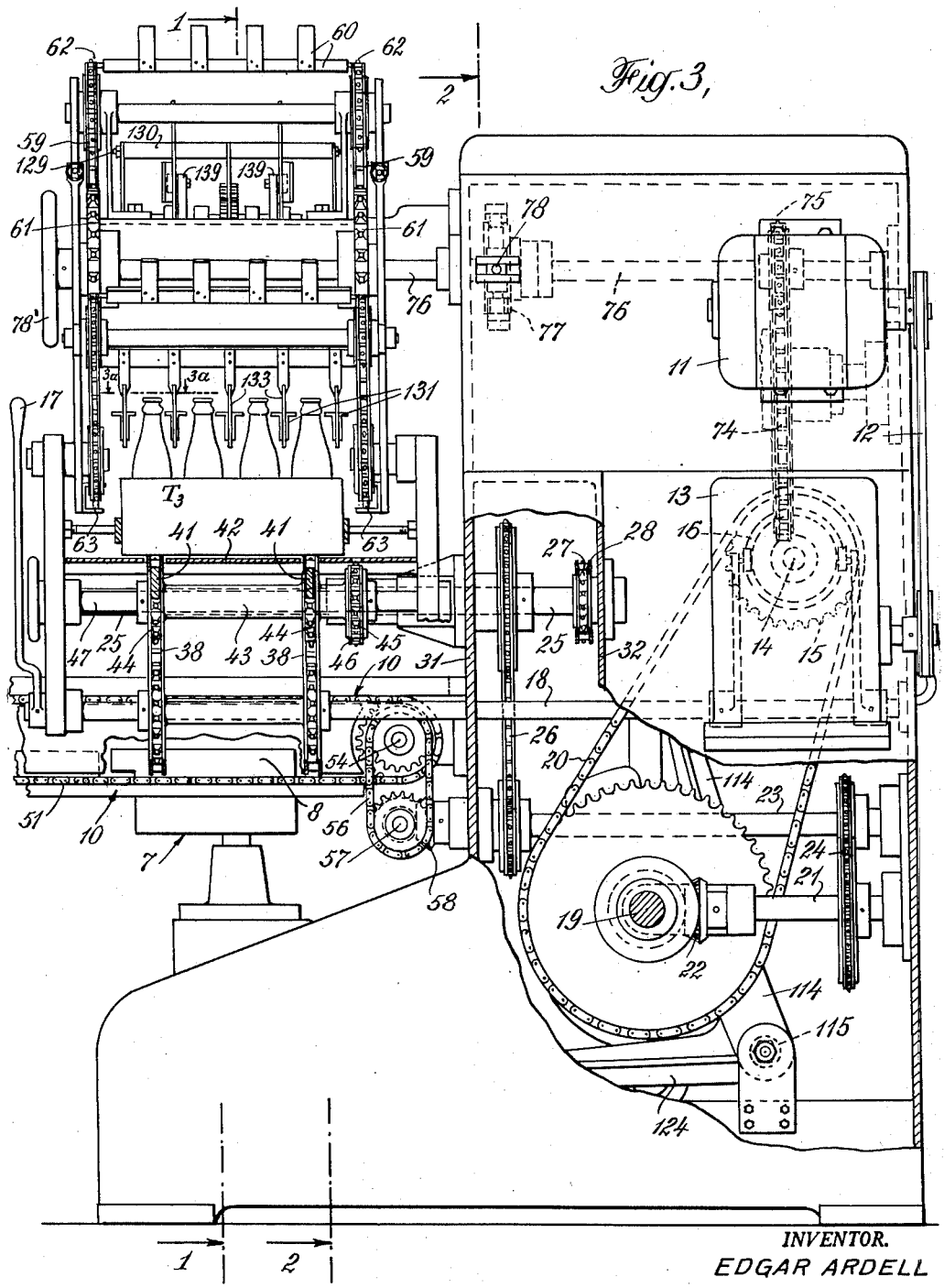
Fig. 3 is a vertical transverse section taken on broken line 3—3 of Fig. 2 and Fig. 1.
Figure 4:
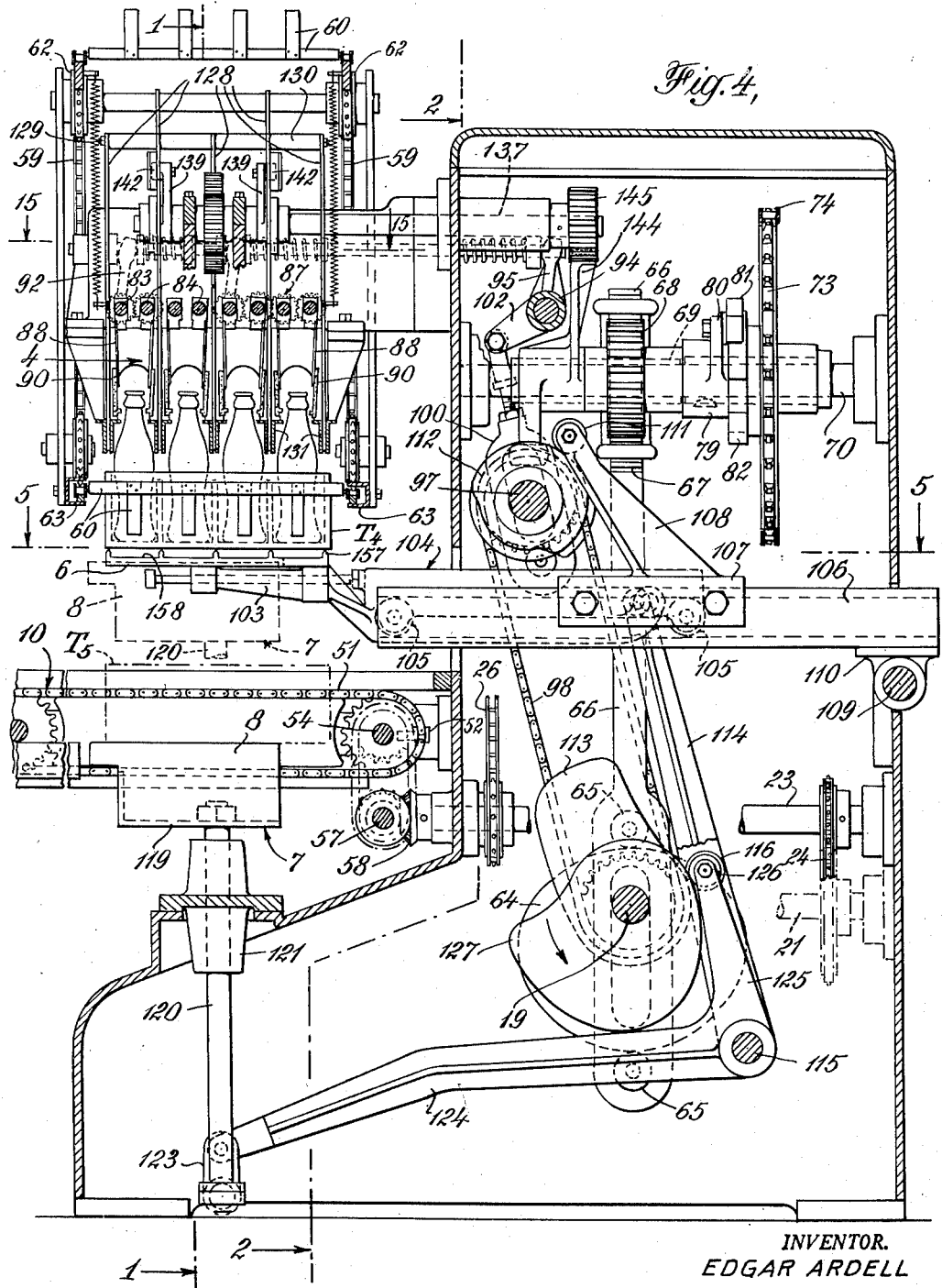
Fig. 4 is a section similar to that of Fig. 3 taken on the plane indicated by line 4—4 of Fig. 2 and Fig. 1.

The discharge or ejecting conveyer 10 (Fig. 4) comprises a pair of widely spaced endless chains 51 (Figs. 1 and 5) which are mounted to travel on the opposite sides of tray remover 7 when it is in its lowermost position as shown in Figs. 1, 3 and 4. These two chains have a single pair of inwardly and horizontally projecting lugs 52 which engage the rear of the tray at position T5 and slide the tray along the upper edges of plates 8 onto any suitable off-bearing conveyer for the trays such as roller conveyer 53 (Fig. 5), which, it will be understood, is of the gravity type. Conveyer chains 51 are trained around sprockets on a driven shaft 54 and also around outwardly placed idler sprockets 55 (Fig. 5) which are bracket mounted. Shaft 54 is driven from shaft 23 (Fig. 3) by means of a short chain 56, a short shaft 57 and bevel gearing 58.

Flight conveyer 3, which operates simultaneously to position a filled case on platen 6 and moves the preceding charge of bottles off of the platen onto conveyer 5, comprises a pair of long endless chains 59 between which extend a series of flight bars 60, arranged in appropriately spaced relation throughout the length of the chains. These flight bars are each provided with a series of downward projections or extensions (Figs. 3 and 4), one for each of the four rows of bottles so as to push the bottles from their midsections downward to prevent overturning. Flight chains 59 are mounted at the front and rear of the stationary bottle gripper head 4 (Figs. 3 and 4), these chains being trained around a pair of driving sprockets 61 (Fig. 1) and a series of appropriately placed idler sprockets 62. The two lowermost sets of idler sprockets 62 are positioned at the opposite ends of two straight horizontal channel sections 63 so as to maintain the lower reaches of chains 59 substantially in a horizontal plane while the flight bars are moving the group of bottles and the filled case respectively.

It will be understood that endless conveyer 34 of tray feeding device 1, conveyer chains 38 of tray timing conveyer 2, and tray ejecting conveyer chains 51 are operated continuously at uniform speed. Flight chains 59, however, of flight conveyer 3 are operated intermittently, that is, with a step-by-step motion so as to advance these chains the distance between the two adjacent flight bars 60 at each movement.

Figure 2:
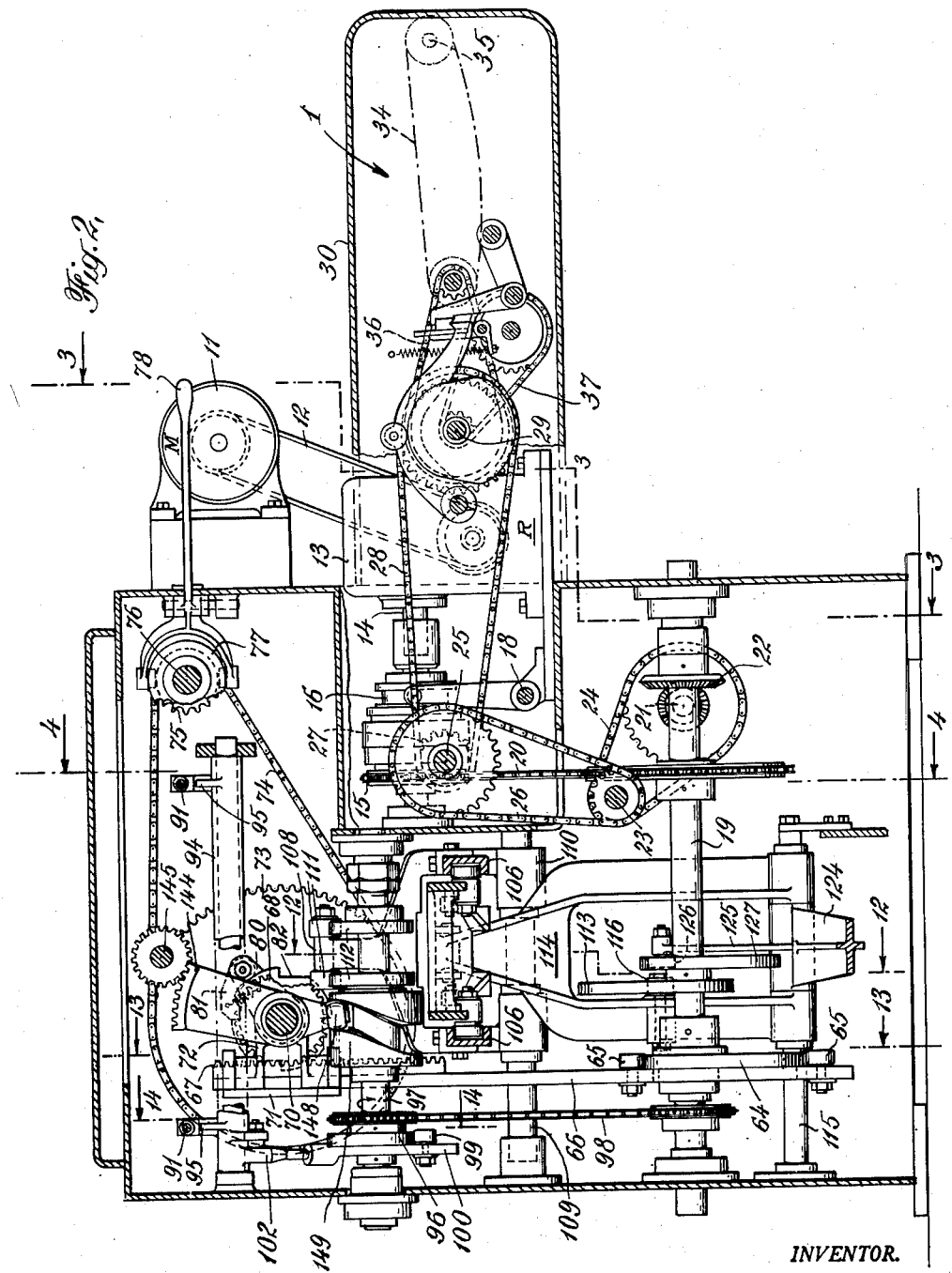
Fig. 2 is a similar section taken on a plane in the rear of the plane of Fig. 1 and indicated by line 2—2 of Figs. 3 and 4.

The mechanism for deriving this intermittent drive is shown more particularly in Figs. 2, 4 and 13. A substantially heart-shaped cam 64 is mounted on the main or lower cam shaft 19 and rotates continuously with this shaft. The edge of this cam engages upper and lower rollers 65 which project from one face of a vertically movable rack bar 66. The lower end of this bar is slotted as shown in Fig. 4 and is guided by shaft 19. The upper end of rack bar 66 has a series of rack teeth 67 which drive the teeth of a gear 68.

Gear 68 is keyed to a sleeve 69 which rotates on a fixed shaft 70 extending transversely of the machine. In order to maintain rack teeth 67 and gear 68 in engagement a keeper member 71 is used. This has a horizontal extension 72 (Fig. 2) having a bearing surrounding sleeve 69, the rear face of bar 66 having sliding contact with the inner vertical surface of keeper 71.

Turning freely on sleeve 69 just to the right of bearing extension 72 of the keeper member there is a large sprocket 73 which is connected by means of a chain 74 with a smaller sprocket 75 on a shaft 76 which is the shaft on which driving sprocket 61 for the flight chains 59 is mounted. Sprocket 75, however, is connected to shaft 76 through a throw-out clutch 77 operated by handle 78. By throwing out this clutch the position of flight bars 60 can be manually adjusted by means of a hand wheel 78' (Fig. 3).

The large sprocket 73 is driven by the oscillating gear 68 and sleeve 69 by means of a ratchet drive. This drive comprises a hub 79 which is keyed to sleeve 69 and which has an arm 80 on the side of which a driving dog 81 is pivoted. Dog 81 engages the teeth of a ratchet wheel 82 mounted on the hub of large sprocket 73. Ratchet wheel 82 has four teeth, 90 degrees apart, and the arrangement of cam 64 and the driving connections described is such that gear 68 is oscillated through the angle of 90 degrees at each stroke of rack bar 66. The contour of cam 64 is such as to impart harmonic motion to rack bar 66 so that flight chains 59 also move with harmonic motion, thereby starting and stopping the filled cases and the group of bottles removed from the previous case gently and quietly.

The mechanism of the stationary bottle gripper head 4 will now be described, this mechanism being shown more particularly in Figs. 1, 4, 8 and 14. Mounted for rocking movement in the two end frames of gripper head 4 there are a series of closely spaced parallel rock shafts 83 and 84. These shafts are arranged in pairs, each alternate shaft 83 being paired with an intermediate shaft 84. The shafts of each pair are operatively connected together at their ends for rocking movement in opposite directions by gear groups 85 at one end and 86 and 87 at the opposite end. The arrangement of this gearing is such that by rocking only the first and fifth shafts 83 from the left of Figs. 14 and 15, the entire four pairs of shafts are actuated.

The central portions of shafts 83 and 84 are rectangular in cross section as shown in Figs. 8 and 1, and mounted on shafts 83 are sets of spring fingers 88, while on shafts 84 are similar but oppositely directed spring fingers 89. There are six pairs of fingers 88 and 89 on each pair of shafts 83 and 84, one pair of fingers for each of the six bottles of a row, as can be seen in Fig. 1. The lower ends of each of fingers 88 and 89 are provided with resilient pads or cushions 90 appropriately formed at their lower ends to grip the opposite sides of the bottle necks as shown in Fig. 7.

The actuation of the first and fifth shafts 83 in order to cause the fingers to grip or release the group of bottles simultaneously is shown in Figs. 14, 15 and 2. This includes two horizontally shiftable rods 91, one at each end of gripper head 4, both of these rods being operatively connected to both ends of the first and fifth rock shafts 83. This connection is by means of short levers 92 which are forked at their upper ends to receive rods 91, these levers being fixed to the first and fifth rock shafts 83 and connected to rods 91 through spring mounted collars shown in Figs. 14 and 15.

Sleeves 91 are mounted for sliding movement in the frame of the gripper head and are biased in the direction to hold the bottle gripping fingers 88 and 89 open, by means of a compression spring 93. Rods 91 are operated in the opposite direction to grip the bottles by means of a sleeve rock shaft 94 (Figs. 2 and 4) having two short arms 95 in engagement with the ends of the respective rods 91. Sleeve rock shaft 94 is actuated by means of a cam 96 on an upper cam shaft 97 (Figs. 2 and 4). Cam shaft 97 is parallel with the lower or main cam shaft 19 and is driven in the same direction and at the same speed as this shaft by means of an endless chain 98.

Cam 96 engages a roller 99 on a slotted yoke 100 which is guided by shaft 97 and which is operatively connected at its upper end by means of a link 101 to an actuating arm 102 extending to sleeve rock shaft 94.

The platen 6 has two movements during its operation, first a lowering movement and then a lateral retracting movement. The mechanism for imparting these movements is shown in detail in Fig. 12 and also in Figs. 2, 4 and 5. Platen 6 is mounted on the end of an arm 103 which projects forwardly and forms a part of a rectangular carriage 104 (Fig. 5) having two pairs of rollers or wheels 105, one at each corner. Rollers 105 are received in two oppositely facing parallel channel members 106 which form a part of a pivoted supporting structure for carriage 104.

Channel bars 106 are tied together by means of a rugged cross member 107 having a central arm 108 projecting upwardly at approximately 45 degrees (Fig. 12). Channels 106 are tied together to form a rigid structure by means of a shaft 109 which is firmly secured to the lower sides of channels 106 by means of brackets 110. Shaft 109 is supported for rocking movement at its ends by brackets which are secured to the frame of the apparatus (Fig. 2).

The supporting structure 106, 107 referred to has two means of support on the frame of the machine; one is the pivot shaft 109 and the other is the 45° angle bracket 108 which at its upper end is provided with two rollers 111, one on each side (Fig. 2) which rest respectively upon two lowering and raising cams 112, these cams being fixed on the upper cam shaft 97.

When rollers 111 are on the upward portions of cams 112 (Fig. 12), structure 106, 107, carriage 104 and platen 6 are held in an upper and horizontal position where platen 6 is ready to receive a filled case from timing conveyer 2. When cam shaft 97 revolves and rollers 111 descend to the lower portion of cams 112, the entire assembly is tilted about pivot shaft 109 lowering platen 6 to the dotted position which is shown in various figures. This occurs during the retraction and return movements of the platen 6 in order that the platen may free itself from the bottom of the filled case resting on the tray remover in the first movement and clear the bottoms of the suspended bottles on the second movement.

The retracting and return movements of platen carriage 104 are caused by a platen carriage cam 113 which is keyed to main cam shaft 19 (Figs. 2 and 12). The connection between cam 113 and platen carriage 104 is by means of an upright forked lever 114 of rugged construction, this lever being forked at its lower end and the lower ends of these forks mounted for rocking movement on a fixed shaft 115 secured to the machine frame. A cam follower roller 116 is mounted for rotation on a shaft which is mounted on one of the legs of forked lever 114 (Fig. 2) and projects horizontally between these two legs.

The upper end of forked lever 114 is connected to platen carriage 104 by means of a short adjustable link 117 (Fig. 5), this link being connected to a pivoted cross member 118 which extends between the sides of carriage 104. A heavy tension spring (not shown), connected at one end to forked lever 114 and at the opposite end to the machine frame, maintains cam follower roller 116 against the surface of cam 113 and produces the return or outward movement of the platen carriage. It will be understood that the action of cam 113 is to retract carriage 104 after cams 112 have lowered platen 6 to the dotted position, the extent of the retracting movement being shown, for example, in Fig. 8.

Coming now to the mechanism for operating tray remover 7, it has been stated that this device includes two parallel edgewise mounted plates 8, the upper edges of which are in the same horizontal plane, platen 6 being slotted (Fig. 5) so that when the platen is lowered as just described, plates 8 will extend through the slots 9 to support the tray while the platen is retracted, and will thereafter lower the tray away from the charge of suspended bottles. Plates 8 extend upwardly from a bottom plate 119 (Fig. 1) with which they may conveniently be made integral.

Bottom plate 119 is mounted in fixed position at the upper ends of two parallel vertically movable rods 120 which are arranged to slide in bearings 121 in the apparatus frame. The lower ends of rods 120 are connected together by a cross bar 122, to which is pivoted a shackle-type link 123. The upper end of this link is connected to the left end of an operating lever 124 (Fig. 4). Lever 124 pivots on shaft 115 between the two legs of the forked lever 114 which retracts the platen (Fig. 2). Lever 124 has an upward extension 125 at the upper end of which a roller 126 is mounted, this roller cooperating with a cam 127 which operates to lift and lower tray remover 7. Cam 127 is fixed on main cam shaft 19 adjacent cam 113 (Fig. 2).

Cooperating with tray remover 7 in taking the tray off from the suspended bottles is a tray stripping mechanism shown more particularly in Figs. 8 and 8a, with parts thereof also illustrated in Figs. 1, 2 and 4. This mechanism comprises a series of five parallel vertical plates 128 secured together so that they will operate as a unit and mounted for vertical sliding movement in the structure of the gripper head 4. The lower edges of these plates are in the same horizontal plane and serve to engage the top of the tray (Fig. 8) and push it downwardly as tray remover 7 descends so as to force the tray free of the bottles should any of the bottles tend to stick in their cells.

The five plates 128 are tied together at their upper ends by means of two rods 129 and spacing collars 130 which separate the respective plates. During their down and up movement, plates 128 are guided between spaced longitudinally mounted angle members 131. These angle bars are mounted on the frame of gripper head 4 just below the ends of the bottle gripping fingers 88, 89. The vertical portions of angle members 131 guide the stripper plates 128 and the horizontal portions of these angle members serve to guide the necks of the bottles in the four rows into position between the bottle gripping fingers.

For this reason the forward ends of the horizontal portions of angle members 131 are pointed as shown in Fig. 3a, and in order to prevent the bottles from being caught on the spaced points 132 of these members, which are separated by the thickness of the stripper plates 128, thin auxiliary guides 133 having rounded or pointed ends are mounted ahead of each pair of angle plates 131 in line with the stripper plate guiding surfaces. These auxiliary guides 133 are triangular in side view and taper to a sharp point, as shown in Fig. 1, with gently upwardly sloping edges, so as to remove any debris such as paper napkins, etc. which the inspector may have failed to remove from the trays before they reach the machine.

The stripper plate structure bound together by tie rods 129 is guided at each end of gripper head 4 as shown in Fig. 1 by means of two small rollers 134 in order to reduce friction. These rollers cooperate with the edges of the two plates 128 which are next to the outside plates and are somewhat thicker than the remaining stripper plates (Fig. 8). The two outside plates and the center stripper plate are cut away upwardly from about their centers in order to reduce weight, and the entire stripper plate structure is suspended by four tension springs 135 to partially counterbalance its weight.

The stripper plate structure is moved up and down by mechanism which is associated with the two plates 128 which are next to the outside plates. These two plates are not cut away but extend upwardly as shown in Fig. 8a, being slotted vertically as shown at 136 to provide clearance for a horizontal stripper operating shaft 137. On each side of shaft 137 are two short crank shafts 138. These have cranks 139 at each end so that each shaft has two cranks.

Crank shafts 138 are geared to operating shaft 137 by means of a central driving gear 140 on shaft 137 and two smaller gears 141, one on each of the respective shafts 138. Cranks 139 are set parallel with one another and rotate in unison. Each of these cranks has a crank pin 142 which operates in a horizontal slot 143, there being two of these slots in each of the two plates 128 which are next to the outside plates. To provide greater crank pin bearing area slots 143 are preferably reenforced as indicated in Figs. 8 and 8a.

From this construction, it will be understood that when cranks 139 are in their lower position as shown in Figs. 8 and 8a the stripper plates 128 will be in their lower position, and when cranks 139 are rotated simultaneously through an angle of 180° to their upper position, the stripper plates will be raised to their upper position, as shown, for example, in Figs. 1 and 6.

Operating shaft 137 is oscillated to actuate the cranks 139 as just described. This oscillating movement is derived from a gear segment 144 whose teeth mesh with those of a gear 145 on the rear end of shaft 137 (Figs. 8 and 2). Gear segment 144 has a hub 146 which pivots on stationary shaft 70 just to the left of rack bar 66 and gear 68 (Fig. 4). On the lower side of hub 146 there is a short arm 147 on the lower end of which is mounted a roller 148 which engages in the groove of a cylinder cam 149 (Fig. 2), this cam being keyed to upper cam shaft 97.

Referring to Fig. 1, device 150 is a debris detector. The trays of empty bottles are often returned to the bottling plant with various articles of debris in between or beneath the bottles, such, for example, as wads of paper napkins, drinking straws, etc. The trays as they pass along a conveyer after being removed from the delivery truck are inspected for the purpose of removing such articles. Detector 150 operates to stop the driving motor 11 should articles of this sort be left by the inspector.

Device 150 consists of a horizontal plate which is pivoted at 151 to the upper end of a fixed post, and projecting downwardly from such horizontal plate there is a series of thin parallel plates 152, one of these plates being positioned between each two adjacent rows of bottles. The lower edges of these plates are curved as shown and the device as a whole is supported by means of an adjustable stop screw 153 so that the lower surface of the horizontal plate just clears the tops of the bottles. An article of any substantial size which rests on the case partition between any two rows of bottles will lift detector 150 somewhat; also, if any bottle does not stand upright in its cell, or is raised above the bottom of the tray by some object beneath it, this will also lift the detector. Such movement moves a long vertical arm 154 fixed to the pivot shaft and this movement releases the actuating lever 155 of a switch 156 which is connected in the control circuit of driving motor 11. The circuit is thereby opened and the motor stopped.

A complete cycle of operation of the apparatus will now be reviewed as follows. Assuming that a tray filled with bottles has just been advanced by flight conveyer 3 to the position shown in Fig. 1 beneath gripper head 4, the tray rests on a series of parallel ridges 157 which extend lengthwise of platen 6 and which later on serve to receive the bottles between them after the tray has been removed, and maintain the bottles in rows as they are moved off of the platen.

The tops of ridges 157 are at the elevation shown in Figs. 1 and 4 (and in Fig. 6, dotted) which is at the same level as the left end of plate 42 over which the filled case is delivered to the platen. Allowing for the thickness of the bottom of the tray and the height of the bottles, the bottle tops will be at the elevation shown in Fig. 4 and in dotted lines in Fig. 6, which is above the bottle gripping position of the gripper head of the bottle gripping fingers. These gripping fingers, however, are in their released or open position as shown in Fig. 4.

The first step in the cycle of operation of the machine is the raising of bottle remover 7 by its operating cam 127 until the height of the upper edges of plates 8 is at a level which, if the tray were resting on it, the bottoms of the bottles in the tray would be about $\frac{1}{16}$ or $\frac{1}{8}$ of an inch above the bottle supporting surface 158 of the platen, on which the bottles will rest after the tray has been removed. The bottle supporting surface of the platen is constituted of the flat areas between ridges 157. This position of plates 8 of the case remover is indicated in dotted lines in Fig. 4 and in full lines in Fig. 6, and depends on the thickness of the tray bottom.

Following the arrival of tray remover 7 in the position just described, platen 6 is tilted downwardly by the operation of the pair of cams 112, the platen supporting structure pivoting about shaft 109 until the platen surface 158 has lowered from the horizontal, dotted position of Fig. 6 to the tilted, full line position. This lowers the filled case slightly and it rests upon the upper edges of plates 8. The bottle gripping fingers 88, 89 are then actuated to grip the bottles (Fig. 6) and platen 6 is retracted to the right by the action of cam 113 to the position shown in Fig. 7.

As soon as the bottles are engaged by the grippers, tray remover 7 commences to lower to the position shown in Fig. 9 where the tray in position T5 is in the path of fingers 52 of discharge conveyer chains 51. The bottles are left suspended from the gripping devices of gripper head 4.

Commencing somewhat in advance of this downward movement of tray remover 7, stripping plates 128 move downward from their upper position shown in Fig. 6 and engage the top of the tray and the partitions as shown in Fig. 7, which position these plates occupy at about the time tray remover 7 commences its downward movement. Stripper plates 128 continue downward simultaneously with tray remover 7 to the position shown in Fig. 8 where the top of the tray is substantially clear of the bottoms of the bottles.

During the latter part of the downward movement of tray remover 7 platen 6 starts its return movement from the full line position of Fig. 9 towards the dotted line position. After reaching the dotted line position the pair of cams 112 again tilt the platen carriage structure raising the platen until its bottle supporting surface 158 rises to within the 1/16 to 1/8 of an inch of the bottoms of the bottles suspended from the gripper head, the extent of the bottle drop thus being made substantially negligible. Then the gripping fingers 88, 89 are actuated to release the bottles onto platen 6 as shown in Fig. 10. Thereupon, a step movement of flight conveyer 3 commences and one of the flight bars 60 pushes the bottles along the platen surface 158 between guiding ridges 157 off of the platen and onto receiving table or conveyer 5. At the same time a succeeding flight bar 60 advances a new filled case from position T3 to position T4 on the platen, after which the cycle repeats.

The case feeding device 1 is tripped at about the time that flight conveyer 3 commences to move. Belt 34 of feeding device 1 operates rapidly, and quickly advances the case at position T2 (Fig. 1) towards tray timing conveyer 2 and the front of this tray may contact the two spacing lugs 40 of chains 38 (Fig. 11). These lugs hold the front of this tray spaced from the rear of tray T3 so that the downward moving flight bar 60 shown in Fig. 11 can descend behind tray T3. Timing conveyer chains 38 advance continuously and slowly but are so timed with respect to the flight bar 60 as to position the rear of tray T3 so that the flight bar, in its descent, will clear the tops of the bottles in this tray. It will be understood that the trays and bottles shown in Fig. 11 are in motion, this figure indicating the position of the parts just as flight bar 60 is clearing the tops of the bottles in tray T3, and the bottles on platen 6 having just commenced to move towards off-bearing conveyer 5, by which the bottles may be delivered, for example, to a washing or soaking apparatus.

This invention has been described in detail in connection with one particular embodiment thereof. It will be understood that other embodiments which include various changes in the construction and arrangement of the various parts of the apparatus may be made without deviating from the spirit of the invention or exceeding its scope as set forth in the appended claims.

I claim:

1. In apparatus for unloading articles from shipping cases, a stationary gripper head having grippers constructed and arranged to releasably support a charge of articles suspended therefrom, a shiftable platen constructed and arranged to serve at one time as a support for a tray filled with articles to present said articles to the gripper head for support thereby, and to serve at another time as a support for the charge of articles removed from the tray, mechanism operable to shift said platen to a position beneath said gripper head, means for feeding onto said platen a tray filled with articles, means for actuating said grippers to support said articles, said shifting mechanism thereafter operating to withdraw said platen from beneath said gripper head, mechanism operating during said withdrawal to receive and remove the empty tray, said shifting mechanism thereupon returning said platen to position beneath said gripper head, means for actuating said grippers to release the articles onto said platen, and means for removing the articles from the platen.

2. In an apparatus for unloading articles from shipping trays, a stationary article-gripper head constructed and arranged to releasably support a charge of articles suspended therefrom, a platen constructed and arranged to support a tray filled with articles to present said articles to the gripper head for support thereby, means for retracting said platen from beneath said tray to allow removal of the tray from the suspended articles, means for removing said tray while the platen is retracted, means for returning the platen beneath the gripper head to receive the articles therefrom, and means for simultaneously removing the charge of articles from the platen and advancing a succeeding filled tray onto said platen.

3. An apparatus for unloading articles from shipping trays comprising an article receiving table, a stationary gripper head constructed and arranged to releasably support a charge of articles suspended therefrom with the bottoms thereof at approximately the level of said table, a platen retractable laterally at the same level, means to advance a filled tray onto said platen, a tray remover constructed and arranged to support said tray to permit the retracting of said platen, means for raising said tray remover to a level advancing the bottom of the tray on the platen, means for retracting the platen leaving the tray resting on the tray remover, means for actuating said gripper head to grip and support the charge of articles in said tray, means for lowering said tray remover to remove the tray from the suspended charge of articles, means for returning the platen beneath said charge of articles, means for actuating the gripper head to release the articles onto the platen, and means for moving the released articles off of the platen and onto said receiving table.

4. An apparatus as set forth in claim 3 in which the platen is lowered slightly prior to the retracting of the platen.

5. An apparatus as set forth in claim 3 wherein the platen is tilted downwardly prior to the retracting of the platen.

6. An apparatus as set forth in claim 3 wherein there is provided a tray-ejecting conveyer constructed and arranged to move the tray off of the tray remover after the tray remover has been lowered, and means for operating said ejecting conveyer in timed relation to the lowering of said tray remover.

7. An apparatus as set forth in claim 3 wherein the platen is provided with spaced openings and the tray remover is operable through these openings to support the tray while the platen is retracted.

8. In apparatus for unloading articles from shipping trays, an article receiving table, a stationary gripper head constructed and arranged to releasably support a charge of articles suspended therefrom with the bottoms thereof at approximately the level of said table, a platen disposed at the same approximate level constructed and arranged to support a tray filled with the articles to present said articles to the gripper head for support thereby, means to advance a filled tray onto said platen, said platen being retractable to permit downward removal of the tray from the articles, a tray remover constructed and arranged to support said tray to permit the retracting of the platen, and means for raising and lowering said tray remover.

9. Unloading apparatus as set forth in claim 8 wherein the platen is provided with spaced openings and the tray remover is operable through these openings to support the tray.

10. Unloading apparatus as set forth in claim 8 wherein the platen is provided with spaced parallel slots and the tray remover with two edgewise mounted parallel plates which are operable through said slots to support the tray.

11. In apparatus for unloading articles from shipping trays, a stationary gripper head constructed and arranged to releasably support a charge of articles suspended therefrom, a platen constructed and arranged to support a tray filled with the articles to present said articles to the gripper head for support thereby, means to advance a filled tray onto said platen, said platen being retractable to permit downward removal of the tray, a tray remover constructed and arranged to support said tray to permit the retracting of the platen, means for raising and lowering said tray remover, a vertically movable tray stripping device, and means for moving said device downward simultaneously with the lowering of said tray remover to engage the top of the tray and force it away from the suspended articles.

12. An apparatus for unloading articles as set forth in claim 11 wherein the article grippers of the gripper head are arranged in parallel rows and between each two adjacent rows are located two stationary elongated guides for guiding the upper ends of the articles to the grippers as the filled tray is advanced onto the platen, said guides being spaced apart to serve also as guides for the tray-stripping devices which are arranged to slide between them.

13. In apparatus for unloading articles from shipping trays having a stationary gripper head constructed and arranged to releasably support a charge of articles suspended therefrom, and a platen constructed and arranged to support successive trays filled with the articles to present them to the gripper head for support thereby, and alternately with said filled trays to support successive charges of the articles removed from the respective trays and released by said gripper head, mechanism for removing a charge of the articles from said platen and simultaneously advancing a succeeding filled tray onto said platen comprising a tray support at one side of said platen having a tray-timing conveyor associated therewith, a flight conveyer having a plurality of spaced flight bars one of said bars engaging a tray on said support to move it onto said platen and another of said bars simultaneously engaging the previously removed charge of articles on said platen, and a tray-timing device for moving trays one at a time onto said support, said tray-timing conveyer being constructed and arranged to space the front end of each incoming tray away from the rear end of the preceding tray to allow a flight bar of said flight conveyer to enter behind said preceding tray.

14. An apparatus for unloading articles from shipping trays as set forth in claim 13 wherein the flights of the flight conveyer are arranged to descend between the trays on the tray support, and the tray-timing conveyer is provided with a pair of spaced tray engaging members, one to hold back the incoming tray and one to advance the preceding tray, the spacing of said members keeping the two trays apart and allowing the flight bar to pass downwardly between them and engage the rear of the preceding tray.

15. An apparatus for unloading articles from shipping trays as set forth in claim 13 in which means are provided for operating the flight conveyer with a step-by-step movement, each advance thereof discharging a removed charge of articles and positioning a filled tray beneath said gripper head.

16. An apparatus for unloading articles from shipping trays as set forth in claim 13 wherein mechanism is provided to operate the tray-timing conveyer with a continuous motion.

17. In apparatus for unloading articles from shipping trays, a platen constructed and arranged to support successive trays filled with articles, and alternately with said trays to support successive charges of the articles, and mechanism for removing a charge of the articles from said platen and simultaneously advancing a succeeding filled tray onto said platen comprising a tray support at one side of said platen having a tray-timing conveyer associated therewith, a flight conveyer having a plurality of spaced flight bars one of said bars engaging a tray on said support to move it onto said platen and another of said bars simultaneously engaging a charge of the articles on said platen, and a tray-timing device for moving trays one at a time onto said support, said tray-timing conveyer being constructed and arranged to space the front end of each incoming tray away from the rear end of the preceding tray to allow a flight bar of said flight conveyer to enter behind said preceding tray.

EDGAR ARDELL.

References Cited in the file of this patent

UNITED STATES PATENTS

| Number | Name | Date |
| --- | --- | --- |
| 2,452,927 | Hammen | Nov. 2, 1948 |